(12) United States Patent
Adas et al.

(10) Patent No.: US 6,614,794 B1
(45) Date of Patent: Sep. 2, 2003

(54) SYSTEM AND METHOD FOR MULTIPLE MODEM TRAFFIC REDIRECTION

(75) Inventors: Abdelnaser M. Adas, Newport Beach, CA (US); Joel D. Peshkin, Irvine, CA (US); Warner B. Andrews, Jr., Boulder, CO (US); Glendon C. King, Boulder, CO (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/261,276

(22) Filed: Mar. 3, 1999

(51) Int. Cl.[7] ............................................... H04L 12/28
(52) U.S. Cl. ...................................... 370/399; 370/401
(58) Field of Search ................................. 370/352–356, 370/230, 235, 389, 392, 395.1, 395.31, 395.32, 397, 399, 401, 474, 466–467, 395.52, 395.53, 395.54, 395.6, 395.61, 395.63, 395.7, 395.71, 395.72, 412; 709/227

(56) References Cited

U.S. PATENT DOCUMENTS

| | | | |
|---|---|---|---|
| 5,717,691 A | | 2/1998 | Dighe et al. |
| 5,765,032 A | * | 6/1998 | Valizadeh .................... 370/412 |
| 5,768,275 A | | 6/1998 | Lincoln et al. |
| 5,796,735 A | * | 8/1998 | Miller et al. ............. 370/395.4 |
| 5,930,257 A | * | 7/1999 | Smith et al. ................. 370/401 |
| 6,111,880 A | * | 8/2000 | Rusu et al. .................. 370/401 |
| 6,112,245 A | * | 8/2000 | Araujo et al. ............... 709/227 |
| 6,118,763 A | * | 9/2000 | Trumbull ................ 370/395.61 |
| 6,172,991 B1 | * | 1/2001 | Mori ...................... 370/395.31 |
| 6,278,707 B1 | * | 8/2001 | MacMillan et al. ......... 370/352 |
| 6,282,193 B1 | * | 8/2001 | Hluchyj et al. ............. 370/356 |
| 6,286,049 B1 | * | 9/2001 | Rajakarunanayake et al. ........................... 709/227 |
| 6,345,051 B1 | * | 2/2002 | Gupta et al. ............. 370/395.2 |
| 6,392,994 B1 | * | 5/2002 | Dubuc ..................... 370/395.1 |
| 6,404,765 B1 | * | 6/2002 | Bernstein et al. ........... 370/397 |

FOREIGN PATENT DOCUMENTS

| | | |
|---|---|---|
| EP | 0836353 A2 | 8/1997 |
| EP | 0851709 A2 | 12/1997 |

* cited by examiner

*Primary Examiner*—Chau Nguyen
*Assistant Examiner*—Andy Lee
(74) *Attorney, Agent, or Firm*—Foley & Lardner

(57) ABSTRACT

A communication system for communication of data packets associated with a packet switched network is disclosed herein. The system includes a port processor, a segmentation and reassembly device, and a host processor. The port processor communicates data packets to and from at least one communication device and at least one destination. The segmentation and reassembly device routes data packets to and from the port processor and the at least one destination. The host processor establishes a virtual circuit between the port processor and the segmentation and reassembly device. The host processor further directs the port processor to communicate data traffic to the segmentation and reassembly device via the virtual circuit, whereby the port processor and segmentation and reassembly device exchange data directly via the virtual circuit without per-packet handling by the host processor of all data traffic.

20 Claims, 3 Drawing Sheets

SYSTEM AND METHOD FOR MULTIPLE MODEM TRAFFIC REDIRECTION

FIELD OF THE INVENTION

The present invention relates generally to communication systems. More particularly, the present system relates to the packet assembly and disassembly associated with packet switched networks.

BACKGROUND OF THE INVENTION

Various systems have been adopted to carry digitally-encoded signals for communication applications, such as, telephone, video, and data services. These systems are often connection-oriented packet mode transmission systems, such as, asynchronous transfer mode (ATM) systems, frame relay systems, X.25 systems, or other transmission systems. Connection-oriented systems (e.g., ATM systems) have been employed in private and public communication systems or networks (e.g., wide area networks (WANs)) to transfer packetized signals (e.g., data cells or protocol data units) across communication lines, such as, telephone lines, cables, optical fibers, air waves, satellite links, or other communication media.

Generally, ATM systems are comprised of nodes or elements which communicate information between each other to ultimately transfer information form a source to a destination. The node or element can be an ATM switch, a hub, ATM interface, edge device, computer equipment, communication device or any apparatus for relaying information.

ATM systems are typically coupled to telephones, modems, other networks, or other communication devices through a port or edge device. The edge device receives data cells from the ATM system and provides data units representing the cells to the systems coupled thereto. Additionally, the edge device receives data units from the systems coupled thereto and provides data cells representative of the data units to the ATM system. Thus, the edge device can provide translation and routing functions, such as adaptation, segmentation, and reassembly operations to interface the systems coupled to it to the ATM system. The edge device often must adapt the data cells of the ATM system to the formats of the systems coupled thereto. The edge device can be an adapting network interface card, an adapting hub, an adapting switch, an adapting concentrator, an ATM desktop device, a router access multiplexer, or other interface device.

One type of ATM system is, for example, an ATM-based telephone system. In an ATM-based telephone system, information in the form of cells is transmitted from subscriber equipment (telephone, modem, or other communication device) modem to a remote access server. Each of the cells contains headers identifying the calling and receiving stations and also contains a payload providing the information being transmitted and received. The cells pass from the calling equipment modem through an access multiplexer to a remote access server. The cells then pass through the remote access server to an intermediate or a destination server for routing to a desired destination. During the transfer of the cells to the destination, the headers may be changed. These changes in the address indicate the path that the cell is following to reach the receiving equipment.

In conventional systems, to reassemble cells into signals at the access multiplexer, the header and the payload in each cell have been transferred to a control memory where the header is processed to determine what path it came from so that the signal can be reassembled based upon this path. This has created certain difficulties. For example, it has required the control memory to be relatively large, particularly since the memory receives the header and the payload. It has also caused the transfer to be slow, particularly since the header and the payload have to be processed and the payload is generally twelve times longer than the header.

Systems for, and methods of, overcoming the disadvantages discussed above exist. For example, U.S. Pat. No. 5,768,275, issued on Jun. 16, 1998, to Lincoln et al., entitled "Controller for ATM Segmentation and Reassembly," the disclosure of which is incorporated herein by reference (hereinafter referred to as the "Lincoln System") discloses one such system. An embodiment of the Lincoln System reduces the time for processing the cells to update the headers as the cells are transferred through the telephone lines between the calling telephone (or other device) and the receiving telephone (or other device).

In one embodiment of the Lincoln System, a header and a payload in a cell are separated for transfer between a cell interface and a host memory. The header is transferred to a control memory. For transfer to the host memory, the control memory initially provides a host-memory region address and the region length. The payload is recorded in such region address. The control memory also provides a second host-memory region address, and length, when the payload length exceeds the payload length in the first region address. For transfer from the host memory to the cell interface, the control memory provides a host memory region address. The cell interface passes the payload from such region address.

Packet or cell processing by large numbers of modems (or other communication devices) located in central locations, cause data communication traffic to become congested through a node, edge device, or element in the ATM system. Such congestion results in data bottlenecks, which degrade communication performance and efficiency. Bottlenecks have become an increasing problem as Internet access has shifted from small points of presence (POPs) to large mega-POPs.

One data communication bottleneck in particular is the host processor located at the remote access server. The host processor links port devices to segmentation and reassembly (SAR) units or other network devices and processes cell headers and payloads. Processing of headers and payloads place a certain load on the host processor. When the host processor is unable to process headers and payloads as fast as they arrive, data bottleneck can occur and data communication speed decreases.

Thus, there is a need for direct communication between port devices and SAR units without transmission of all data traffic to and from a central host processor. Further, there is a need to avoid the bottlenecking of data traffic to and from a central host processor and, thus, decrease the load on the central host processor. Even further, there is a need for multiple hosts to communicate with a single communication device. Even further, there is a need for providing a single device capable of improved communication, whereby data traffic is increased without an ever-increasing level of computing power in some centralized or difficult to distribute resource.

SUMMARY OF THE INVENTION

One embodiment of the invention relates to a communication system for communication of data packets associated with a packet switched network. The system includes a port processor, a segmentation and reassembly device, and a host processor. The port processor communicates data packets to and from at least one communication device and at least one destination.

The segmentation and reassembly device routes data packets to and from the port processor and the at least one destination. The host processor establishes a virtual circuit between the port processor and the segmentation and reassembly device. The host processor further directs the port processor to communicate data traffic to the segmentation and reassembly device via the virtual circuit, whereby the port processor and segmentation and reassembly device exchange data directly via the virtual circuit without per-packet handling by the host processor of all data traffic.

Another embodiment of the invention relates to a communication system for communication of data packets associated with a packet switched network. The system includes a means for communicating data packets to and from at least one communication device and a destination; a means for routing data packets to and from the destination; and a means for establishing a virtual circuit between the means for communicating data packets and the means for routing data packets, and for directing the means for communicating data packets to communicate data traffic directly to the means for routing data packets via the virtual circuit.

Another embodiment of the invention relates to a method for communication of data packets associated with a packet switched network including a subscriber modem, a central site modem, a host modem, and a segmentation and reassembly (SAR) device. The method includes communicating data packets between the subscriber modem and the central site modem; establishing a virtual circuit between the central site modem and the SAR device; and communicating data between the central site modem and a destination without the host modem handling all communicated data.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
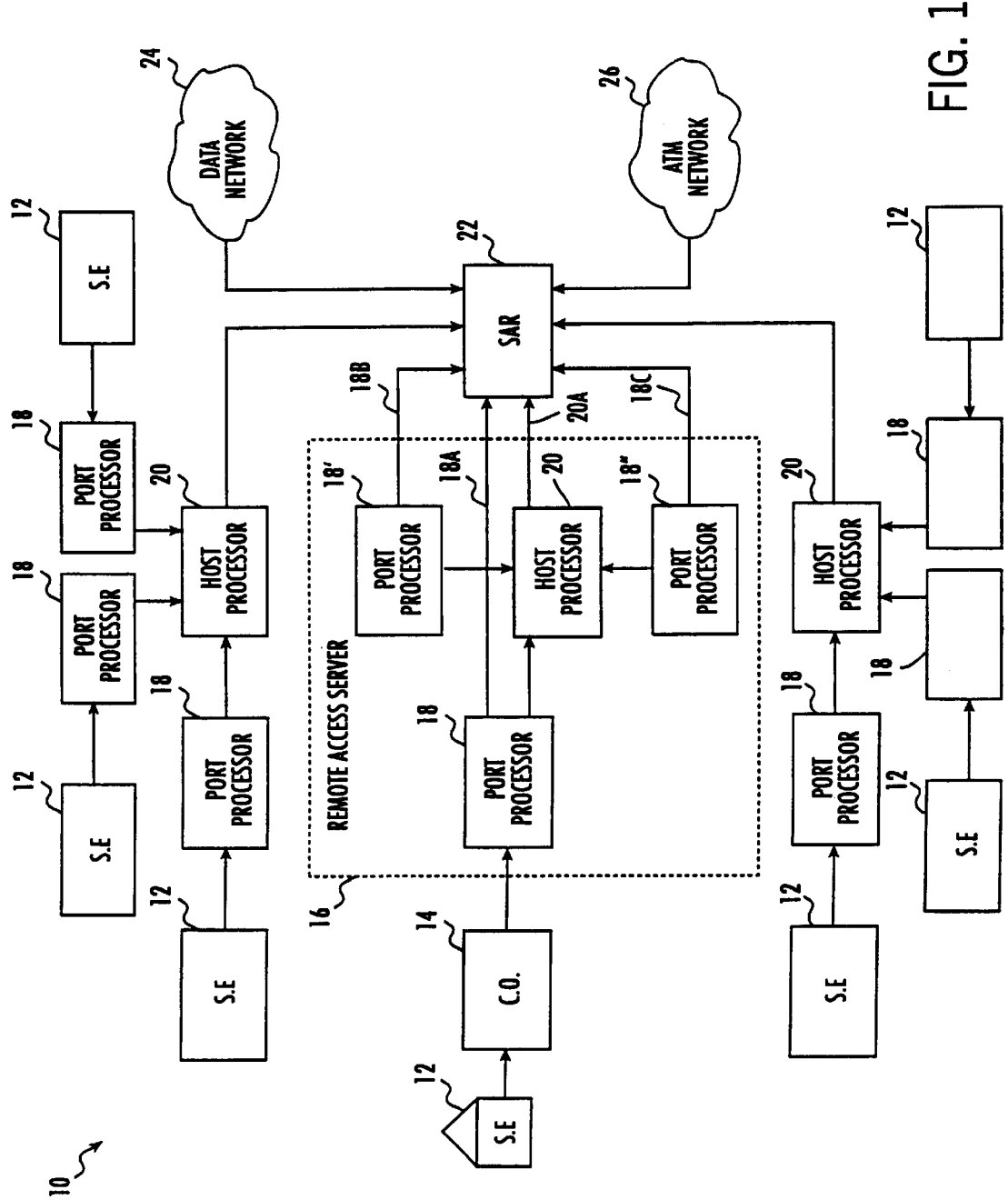
FIG. 1 is a general block diagram of a system for transferring data signals to and from data devices and networks in accordance with the present invention.

FIG. 1 illustrates a block diagram of a system 10 for more efficient and faster transfer of data to and from data communication devices and networks. System 10 includes a subscriber modem 12 or subscriber equipment, a central office 14, a remote access server 16, a port processor 18, a host processor 20, a segmentation and reassembly (SAR) device 22, and a data network 24. System 10 can include a packet-switched network, such as, an asynchronous transfer mode (ATM) network. The present invention is not, however, limited to ATM networks 26. Further, system 10 may be a communication system without central office 14. Central office 14 is characteristic of an implementation of system 10 with the plain old telephone service (POTS), or the public switched telephone network (PSTN). System 10 could be a local area network (LAN), wide area network (WAN) or other communication system.

Software can be designed to perform the functions described herein. In particular, software can be configured to direct the interaction between and among SAR device 22, host processor 20, and port processor 18. Alternatively, hardware devices can be configured to perform the functions described herein. One example of such a hardware device is ASICs (application-specific integrated circuits).

Subscriber modem 12 is a communication device which allows computers and other data communication devices to communicate with each other over the POTS. Subscriber modem 12 can be an analog modem, such as a 56 Kbps modem, digital modem, asynchronous digital subscriber line (ADSL) modem, or any other device which provides for communication between data devices. Central office 14 is a location for receiving signals over the POTS from calling telephones and data communication devices within a particular radius. Remote access server 16 receives communications from subscriber modem 12. Remote access server 16 includes a number of port processors 18 to communicate data from a number of subscriber modems 12 to host processor 20. Host processor 20 directs communication activity to and from multiple port processors 18 in remote access server 16 and to and from SAR device 22. SAR device 22 is a communication device for routing data to and from a destination. Preferably, SAR device 22 provides segmentation and reassembly operations for ATM network 26. Device 22 can be part of networking equipment, such as routers, Ethernet switches, ATM edge switches, or frame relay switches. Network 24 is a collection of communication devices, such as modems, which are capable of communicating with SAR device 22.

Figure 2:
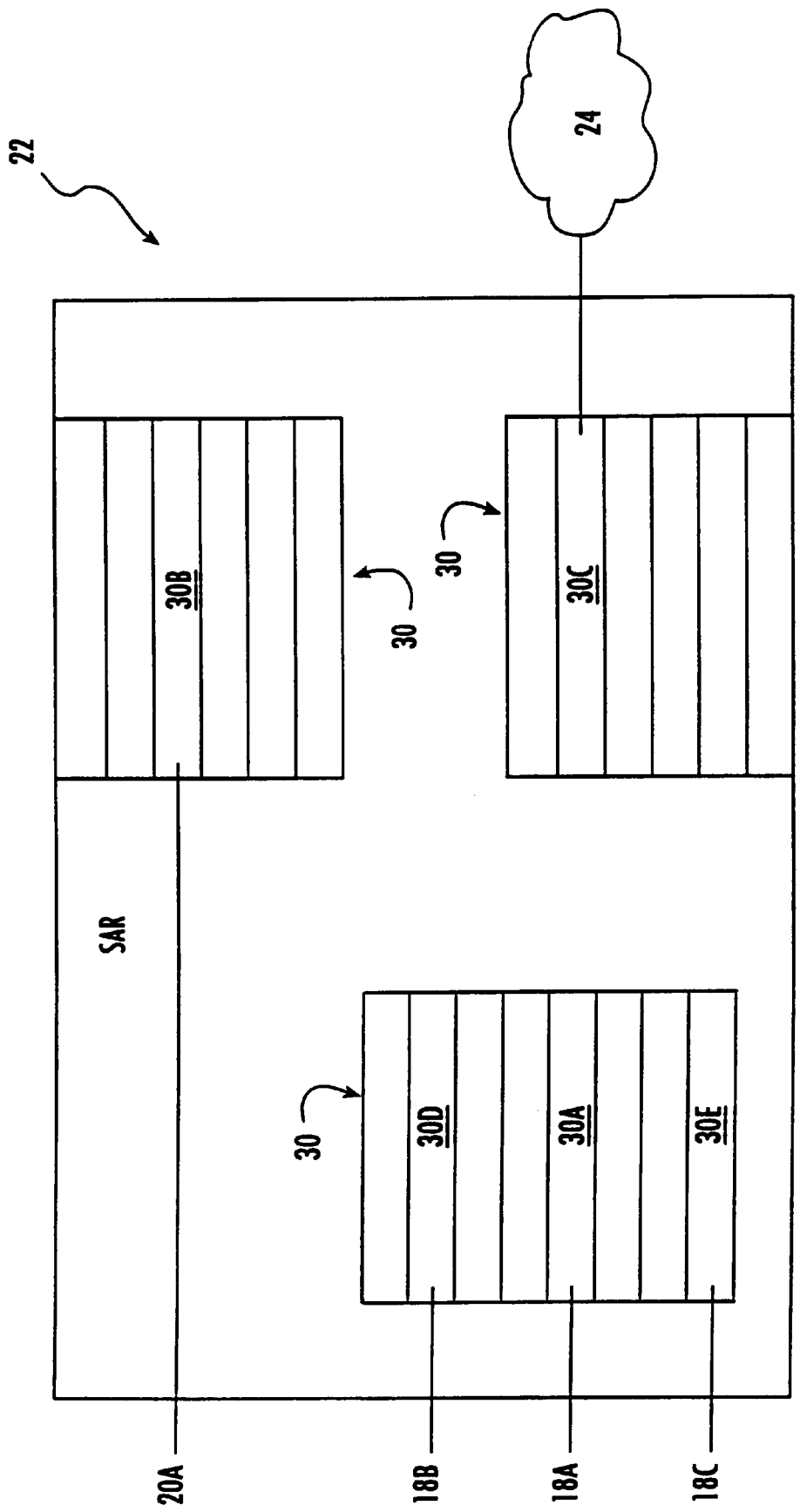
FIG. 2 is a block diagram of a segmentation and reassembly (SAR) device in accordance with the invention illustrated in FIG. 1.

FIG. 2 is a block diagram of SAR device 22, including multiple queues 30 adapted for independent communication with each port processor 18 and host processor 20. Queues 30 are preferably memory locations in SAR device 22. The memory locations can be fully configurable and are arrangeable in any particular order. SAR device 22 preferably has a design similar to an RS8234 Service Segmentation and Reassembly Controller, manufactured by Conexant Systems, Inc., except that SAR device 22 includes multiple queues 30 adapted for independent communication with each port processor 18 and host processor 20. Multiple queues 30 can be adapted or configured by software programs, hardware structures, or both.

Multiple queues 30 and corresponding virtual circuits provide for communication between port processor 18 and SAR device 22 without needing a common device driver (such as host processor 20) to merge independent data traffic streams. For example, queue 30*a* in SAR device 22 receives data communicated to SAR device 22 from port processor 18 via virtual circuit 18*a*. Queue 30*b* in SAR device 22 receives data communicated to SAR device 22 from host processor 20 via virtual circuit 20*a*. Similarly, queue 30*d* in SAR device 22 receives data communicated to SAR 22 from port processor 18' via virtual circuit 18*b*. Queue 30*c* in SAR device 22 receives data from network 24. Because a connection is maintained between port processor 18 and host processor 20, host processor 20 can instruct port processor 18 to direct some data traffic directly to SAR device 22 while having other data traffic be sent from port processor 18 to host processor 20.

In operation, subscriber modem 12 communicates with central office 14 in a system 10 implemented with the POTS. Central office 14 (or the central office 14 closest remote access server 16) transmits signals from subscriber modem 12 to remote access server 16. Remote access server 16 is provided, for example, by an Internet service provider. Within remote access server 16, communications from subscriber modem 12 are received by port processor 18. Port processor 18 communicates with host processor 20. Host processor 20 processes the data packets communicated from port processor 18, including header and payload information, as to establish a connection between port processor 18 and SAR device 22 via a virtual circuit. Host processor 20 directs port processor 18 to route data packet traffic to virtual circuit 18a. Host processor 20 directs SAR device 22 to communicate with port processor 18 via virtual circuit 18a. After the virtual circuit is established, port processor 18 exchanges data packet traffic directly with SAR device 22 without requiring any per-packet handling by host processor 20.

In similar manner, after virtual circuit 18b is established by host processor 20, port processor 18' communicates with SAR 22 via virtual circuit 18b. Further, after virtual circuit 18c is established by host processor 20, port processor 18" communicates with SAR 22 via virtual circuit 18c. Other connections to SAR device 22 are made in like fashion. In some scenarios, host processor 20 instructs port processor 18 to communicate some data packet traffic to SAR device 22 via a virtual circuit and other data packet traffic to host processor 20. As such, all data packet traffic does not necessarily have to be directed directly to the queues of SAR device 22, bypassing host processor 20.

Referring again to FIG. 1, each port processor 18 is potentially responsible for a number of ports. As such, multiple port processors 18 may handle multiple ports. Yet, after an initial setup by host processor 20, each port processor 18 can communicate directly with an independent queue in SAR device 22 via a virtual circuit. Alternatively, port processor 18 can communicate directly with an independent queue in SAR device 22 for some date packet traffic and directly with host processor 20 for other data packet traffic.

Data packet traffic communicated from port processor 18 can be an encapsulation or translation of the data packet traffic from the port or communication device. In an alternative embodiment, port processor 18 performs additional protocol processing. For example, port processor 18 may process data packets according to particular classes of data traffic.

Network 24 is only one possible destination for data communicated from subscriber modem 12. Other destinations may include other modem cards, port processors, or any other point in the network or other connected networks.

Routing instructions given to port processor 18 by host processor 20 may be simple instructions to rout all data packet traffic from a given port to a particular virtual circuit connected to an independent queue on SAR device 24. In an alternative embodiment, routing instructions are more elaborate instructions to send different types or classes of date traffic to different destinations.

Figure 3:
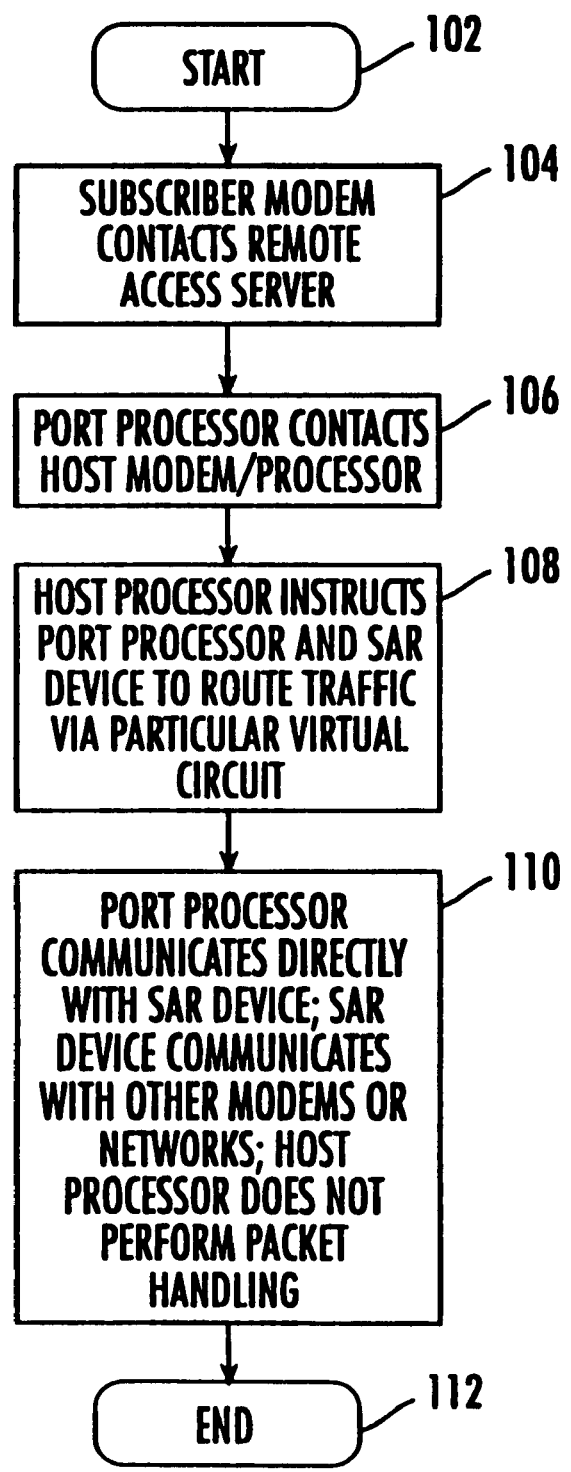
FIG. 3 is a flowchart of a method of operation of the system shown in FIG. 1.

FIG. 3 is a flowchart 100 of the method of communication used in the system shown in FIG. 2. Flowchart 100 includes a step 102 in which the communication session of subscriber modem 12 begins. After step 102, a step 104 is performed where subscriber modem 12 communicates through central office 14 to remote access server 16 including port processor 18. In an alternate embodiment, there is no central office 14, rather subscriber modem 12 communicates directly with remote access server 16.

After step 104, step 106 is performed where port processor 18 communicates with host processor 20. Host processor 20 processes data packet traffic received and communicates the data packet traffic to SAR device 22. Once the communication connection to SAR device 22 is established, in a step 108 host processor 20 communicates to port processor 18 and SAR device 22 as to establish a virtual circuit between port processor 18 and SAR device 22.

After step 108, a step 110 is performed where port processor 18 and SAR device 22 communicate directly, avoiding per-packet handing by host processor 20. As discussed previously, a data packet traffic does not necessarily have to be directly communicated to SAR device 22. Some data packet traffic can also be communicated from port processor 18 to SAR device 22 while other data traffic is communicated from port processor 18 to host processor 20. SAR device 22 includes multiple independent queues 30 which permit separate port processors 18 to maintain independent communication with SAR device 22 without the need for a common device driver (such as host processor 20) to merge the independent traffic streams. SAR device 22 communicates with other ports, cards, or networks outside the system. After step 110, a step 112 is performed where subscriber modem 12 ends the communication session.

With such an architecture, SAR device 22 allows a queue to be shared between SAR device 22 and host processor 20 and a distinct queue to be shared between SAR device 22 and each port processor 18. Each port processor 18 can additionally be responsible for multiple ports.

Thus, SAR device 22 allows a level of scalability without requiring an increase in the level of scalability of the centralized or other difficult to distribute resource, such as host processor 20. This architecture advantageously results in better performance without suffering an impact in cost, power, or size.

While the embodiments illustrated in the FIGURES and described above are presently preferred, it should be understood that these embodiments are offered by way of example only. Other embodiments may include, for example, more detailed routing instructions from the host processor to port processors and SAR device for management of different types or classes of data. Although data traffic is described as being transmitted from terminal equipment 12 (and port processor 18) to SAR device 22, the present invention is applicable to the communication of data from SAR device 22 to port processor 18. The invention is not limited to a particular embodiment, but extends to various modifications, combinations, and permutations that nevertheless fall within the scope and spirit of the appended claims.

What is claimed is:

1. A communication system for communication of data packets associated with a packet switched network, the system comprising:

a remote access server comprising at least a host processor and a port processor, the port processor communicating the data packets to and from at least one communication device and at least one destination;

a segmentation and reassembly device, the segmentation and reassembly device routing the data packets to and from the port processor and the at least one destination; and wherein, the host processor is coupled to the port processor and the segmentation and reassembly device and the port processor being coupled to the segmentation and reassembly device, the host processor establishing a virtual circuit between the port processor and the segmentation and reassembly device, the host processor further directing the port processor to communicate data packets to the segmentation and reassembly device via the virtual circuit, whereby the port processor and segmentation and reassembly device exchange data packets directly via the virtual circuit without per-packet handling by the host processor of all data packets provided on the virtual circuit, wherein the host processor does not process the data packets for the virtual circuit after the virtual circuit is established, wherein the virtual circuit includes a queue associated with the port processor, the queue being part of the segmentation and reassambly device.

2. The communication system of claim 1, wherein the data packets communicated by the port processor includes at least one class of data traffic.

3. The communication system of claim 1, wherein the port processor provides communication for a number of ports.

4. The communication system of claim 1, wherein the segmentation and reassembly device communicates data packets from a plurality of port processors through a plurality of virtual circuits.

5. The communication system of claim 1, wherein the packet switched network associated with the communicated data packets is an asynchronous transfer mode (ATM) network.

6. The communication system of claim 1, wherein the destination to and from which the port processor communicates the data packets is another port processor.

7. The communication system of claim 1, wherein the destination to and from which the port processor communicates the data packets is another data network.

8. The communication system of claim 1, wherein the port processor performs additional protocol processing.

9. The communication system of claim 8, wherein the additional protocol processing includes sending different types of data packet traffic to different destinations via the segmentation and reassembly device.

10. The communication system of claim 9, wherein the additional protocol processing by the port processor occurs at the instruction of the host processor.

11. A communication system for communication of data packets associated with a packet switched network, the system comprising:

a means for communicating the data packets to and from at least one communication device and a destination;

a means for routing the data packets to and from the destination; and a remote access server including means for establishing a virtual circuit between the means for communicating the data packets and the means for routing data packets, and for directing the means for communicating the data packets to communicate data traffic associated with the data packets directly to the means for routing data packets via the virtual circuit, where the means for establishing does not receive the data traffic associated with the data packets or portions thereof after the virtual circuit is established, wherein the virtual circuit includes a queue associated with the means for communicating, the queue being part of the means for routing.

12. The communication system of claim 11, wherein the packet switched network associated with the communicated data packets is an asynchronous transfer mode (ATM) network.

13. The communication system of claim 11, wherein the means for routing the data packets to and from the destination communicates the date packets from a plurality of means for communicating the data packets through a plurality of virtual circuits.

14. The communication system of claim 11, wherein the means for communicating the data packets performs additional protocol processing.

15. The communication system of claim 14, wherein the additional protocol processing includes sending different types of data packet traffic to different destinations via the means for routing the data packets to and from the destination.

16. A method for communication of data packets associated with a packet switched network including a subscriber modem, a central site modem, a host processor, a port processor, and a segmentation and reassembly (SAR) device, the host processor and the port processor being part of a remote access server, the host processor being coupled to the port processor and the SAR device, the SAR device being coupled to the port processor, the method comprising:

communicating the data packets between the subscriber modem and the central site modem;

establishing a virtual circuit between the central site modem and the SAR device via the host processor of the remote access server, the virtual circuit including a queue associated with the port processor; and communicating data associated with the data packets between the central site modem and a destination through the port processor of the remote access server and the SAR device without the host processor handling all communicated data.

17. The method of claim 16, wherein the step of establishing is done by the host processor.

18. The method of claim 16, wherein the destination is another data network.

19. The method of claim 16, wherein the packet switched network associated with the communicated data packets is an asynchronous transfer mode (ATM) network.

20. The method of claim 16, wherein the central site modem provides communication for a plurality of subscriber modems.

* * * * *